United States Patent Office 3,546,317
Patented Dec. 8, 1970

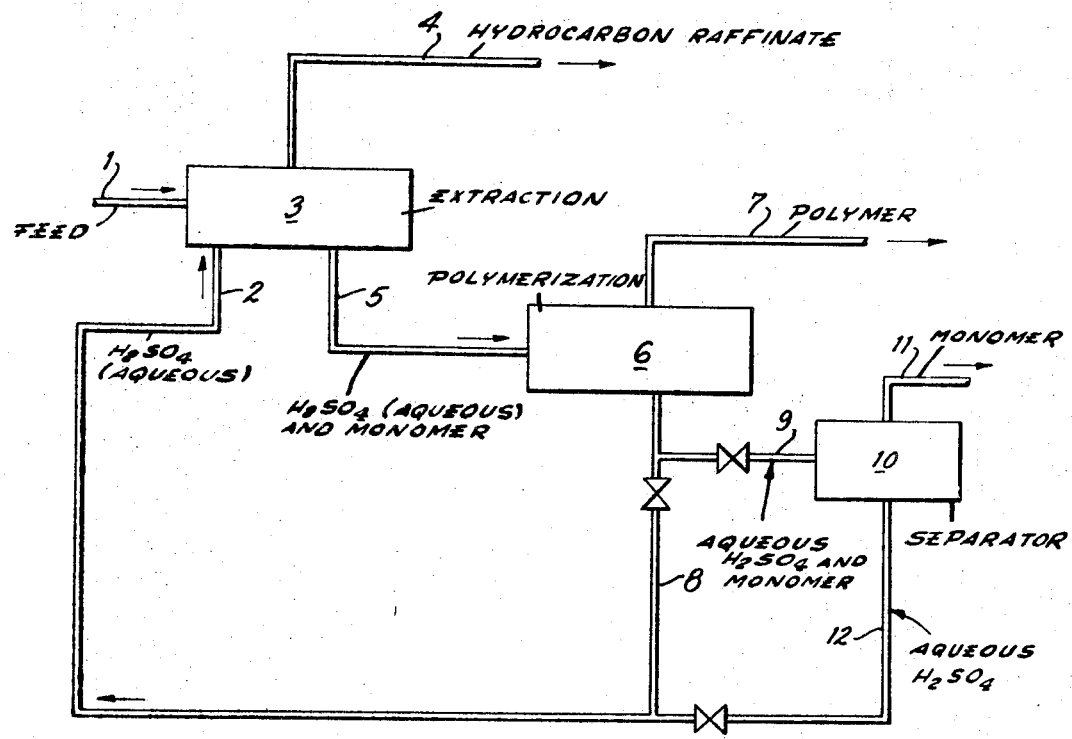

3,546,317
SEPARATION AND POLYMERIZATION OF OLEFINS
Andre Gislon, Paris, Andre Valet, Fontenay-aux-Roses, and Jean-Pierre Michaux and Jean-Jacques Bellec, Le Havre, France, assignors to Compagnie Francaise de Raffinage, Paris, France
Continuation of application Ser. No. 257,958, Feb. 12, 1963. This application Dec. 29, 1967, Ser. No. 694,753
Int. Cl. C07c 3/14
U.S. Cl. 260—683.15                                    2 Claims

ABSTRACT OF THE DISCLOSURE

Methods are provided for the separation of tertiary olefins from mixtures including other hydrocarbons by sulfuric acid extraction, but under conditions where polymerization of the olefins is avoided. Thereafter, and in the same extract medium, selective polymerization is obtained of a portion only of said tertiary olefins with separate recovery of the polymer and unpolymerized monomer and the sulfuric acid solution substantially without dilution for direct recycling in another extraction. A feature of primary importance is that the selected proportion of tertiary olefins in said extract which is to be polymerized and that which is not to be polymerized are controlled and predetermined from time to time as desired merely by varying the time-temperature conditions of the polymerization step and without other variation or alteration in that or other steps of the process or the starting materials fed thereto.

---

This application is a continuation of co-pending application S.N. 257,958, filed Feb. 12, 1963 and now abandoned.

This invention relates to the separation and polymerization of olefinic hydrocarbons present in mixtures of both saturated and unsaturated hydrocarbons and, more particularly, to techniques for the sulphuric acid extraction of such olefines from such mixtures and the selective and controlled polymerization of all or part of the olefines in the acid extract.

As now well understood in this art, quite pure olefinic hydrocarbons may be prepared or separated from mixtures of the desired olefine and other saturated and unsaturated hydrocarbons by selective extraction of the desired olefine by means of an aqueous sulphuric acid solution of medium concentration of the order of about 50% by weight and always less than 55% (along the lines of the disclosures of, for example, Pat. 3,005,856 and/or copending application Ser. No. 87,986, filed Feb. 2, 1961 and now abandoned), after which the olefine is readily recovered from the acid extract, which is in turn available for recycling. Indeed, such selectivity is possible under particular operating conditions so that extraction and recovery of relatively pure four-carbon olefines such as isobutylene is satisfactorily obtained even in the presence of significant proportions of normal olefines such as butene-1 or diolefines such as butadiene, and yet without diluting or reconcentrating the aqueous acid solution, while successfully avoiding undesired polymerization of the olefine being extracted.

Similarly, as also now well understood, olefines have the faculty of polymerizing quite readily, particularly by heating in the presence of aqueous sulphuric acid, to form dimers, trimers, and/or higher polymers. Thus, isobutylene readily is converted into di-isobutylene and tri-isobutylene and other higher poly-isobutylenes, especially when heated in the presence of aqueous sulphuric acid solutions having concentrations of at least 65% acid.

Particularly in large commercial installations for providing either separation of pure olefines without even minor polymer formation or preparation of particular polymer mixtures from olefines, a number of economic factors acquire substantial significance. For example, the market demand for either pure monomeric olefines or polymerized olefines may vary substantially from time to time. In situations where the olefine monomers originate in a particular starting mixture (perhaps from petroleum refining) from which they are extracted and either sold as pure monomer or polymerized, some technical and economic difficulties may be encountered with a large commercial installation requiring separate or different treatments or apparatus depending upon whether the olefine is to be extracted as a monomer or polymerized in accordance with the market demands for the various products, and especially if substantially the same hydrocarbon mixtures used as a starting material in either case. Thus, in accordance with normal practice, it may be necessary to have two complete installations for producing either pure monomer or polymerized materials, with the production of both defined primarily by the current market demand so that, indeed, one or the other installation may be standing idle part of the time.

According to this invention, however, there are provided systems and techniques for either the selective or combined and simultaneous separation and/or polymerization of olefine monomers in hydrocarbon mixtures containing both saturated and unsaturated hydrocarbons by means of extraction with aqueous sulphuric acid solutions having concentrations of less than about 55% whereby the acid extract of the monomer is directly utilized selectively either to recover pure monomer therefrom or to polymerize the monomer in the extract and without intermediate isolation thereof before polymerization treatment and selectively controlled merely upon the regulation of operating conditions as may be desired from time to time depending upon whether pure monomer or a polymerized product is desired at that particular time from the same starting mixture introduced into a single multi-purpose installation. As a further feature of this invention, not only may the polymerization step be performed in the acid extract itself without an intermediate separation of monomer therefrom, but the acid itself is separated from whatever product is desired substantially undiluted and uncontaminated with by-products to be thus available for immediate reuse almost indefinitely, and the operating conditions are readily selected in accordance herewith, for either pure monomer recovery or polymerization or a combination of both, with great versatility and quickly adapted in a single installation for changing market demands.

Although this invention is readily applicable to a variety of olefinic materials, it is particularly suitable for commercial scale application to the selective separation and/or polymerization of isobutylene present in mixtures of olefinic and saturated hydrocarbons having principally four carbon atoms per molecule utilizing a single aqueous sulphuric acid solution in which the concentration is preferably about 50% by weight and no more than 55% by weight, with both monomer recovery and polymerization occurring either separately or simultaneously in the acid extract and without the necessity of previously isolating from the extract the olefines separated thereby from the original mixture, and with the final proportions of separated monomeric isobutylene and isobutylene polymers being readily controlled to whatever ratios may be desired, while also providing for a simplified and versatile multi-purpose arrangement of apparatus for accomplishing either or both of the treatments as may be desired.

With the foregoing and additional objects in view, this invention will now be more particularly described, and other objects and advantages thereof will be apparent from the following description, the accompanying drawing, and the appended claims.

In the drawing there is indicated in diagrammatic or flow-sheet form an arrangement of apparatus and sequence of process steps embodying and for practicing this invention.

Satisfactory and efficient polymerization of isobutylene in acid solutions having concentrations of no more than about 50% acid at efficiencies or reaction rates acceptable in large commercial scale operation becomes all the more surprising when it is recalled that the above mentioned patents utilize such acid concentrations for the separation of pure monomeric isobutylene specifically to avoid even indavertent polymerization thereof and/or accompanying extractions of dimer or trimer contaminates of the desired monomeric product. Nevertheless in accordance herewith and following the operating conditions described below, the foregoing is satisfactorily accomplished and in a manner which, after the polymerization reaction in the acid extract, the sulphuric acid remains substantially free of heavy polymers or other by-products or decomposition products so that it is available immediately for recycling through the extracting steps practically indefinitely for additional extractions and polymerizations of additional quantities of isobutylene.

Thus, the polymerization of isobutylene is satisfactorily accomplished directly by heating the sulphuric acid extracts thereof produced by the extraction of the isobutylene from hydrocarbon mixtures and without the necessity for an intermediate separation of isobutylene from the aqueous solution before the polymerization treatment. Similarly, the same aqueous sulphuric acid solution satisfactorily is made to serve in accordance herewith as both the extracting and polymerizing medium for the isobutylene without the necessity, in the course of either of such steps, to modify the concentration of the acid solution and/or subject it to later purification or regeneration treatments prior to recycling and reuse thereof.

It has been discovered in accordance herewith that probably the most significant operating factors governing the polymerization of isobutylene are the heating temperature and the duration of contact at that temperature. In accordance herewith, the temperature to which the sulphuric acid solutions with about 50% acid concentration and containing extracted isobutylene are heated in generally within the range of 70°–140° C., although a range of about 80°–110° C. is preferred as a range within which the polymerization reaction proceeds with a satisfactory speed and the evolution of gaseous monomer as a result of the heating in the solution remains minimal. Generally, at temperatures less than 70° C. the rate of reaction becomes too low for large scale commercial operation, and operating at temperatures above 140° C. increases the possibility of producing undesired by-products.

Generally, the reaction time at such temperatures is less than about two hours, and with continuous operating procedures in accordance herewith, regulating the contact or reaction time forms a ready and convenient control of a particular degree of conversion desired and, consequently, the ultimate ratio or proportioning between monomeric and polymeric products to be recovered from the acid solution. As illustrative, the following table indicates the reaction times necessary to achieve, at the different temperatures noted, the noted proportions of polymerization of isobutylene in an aqueous sulphuric acid solution of 50% by weight acids with isobutylene present at about 0.55 mole olefin per mole of sulphuric acid.

| | Temperature | | | |
|---|---|---|---|---|
| | 80° C., min. | 90° C., min. | 100° C., min. | 110° C., min. |
| Conversion, percent: | | | | |
| 25 | 20 | 10 | 2 | |
| 50 | 50 | 15 | 5 | About 2. |
| 75 | Above 60 | 60 | 20 | 5. |

Generally in accordance herewith, a polymerization reaction time from one minute to 60 minutes is usually preferred and sufficient depending upon whether only a portion or almost the entire quantity of monomer is to be polymerized. Thus, about 90% of the monomer is polymerized by maintaining at about 100°–105° C. for about one hour an acid extract having about 0.50 mole isobutylene per mole of acid. It should also be noted that the period during which the temperature is being raised to obtain the particular desired value should be as brief as possible (as by utilizing an efficient heat exchanger effective virtually immediately on the total quantity of liquid extract and/or by rapidly injecting liquid to be treated in a large mass of hot liquid in the course of the reaction). This precaution is important to minimize the inadvertent liberation of gaseous monomer from the heating step during any portion thereof before the temperature has achieved the necessary level for polymerization.

Preferably, a moderate superatmospheric pressure is used (for example, less than 20–30 kg./cm.$^2$), although such pressurized operation is not essential. The actual concentration of isobutylene in the sulphuric acid extract solution being treated has only a secondary or unimportant effect on the degree of conversion which is achieved in the polymerization reaction. Thus, acid extracts having concentrations of only 1.0 or 1.5 moles isobutylene per mole of acid have been satisfactorily treated in accordance herewith.

Aside from any small quantities of the monomeric isobutylene liberated, possibly as noted above during the heating up of the solution to reacting temperature, the products formed in accordance herewith are essentially dimers and trimers of the olefine being treated, and the relative proportions thereof fall generally within the ranges of 70–95% dimers and 5–30% trimers and heavier polymers, although the heavier polymers are present usually in only very minor quantities. It has also been found that holding the reaction temperature to around 80°–110° C. influences the products formed toward a greater proportion of lighter products—i.e., lower temperatures increase the proportion of monomers in the final product and decrease that of trimers.

Referring to the drawing as further illustrative of this invention, there is indicated in diagramatic or flow sheet form a system of apparatus and sequence of steps in accordance herewith. Thus, a cut of hydrocarbons comprising a mixture of olefinic and saturated hydrocarbons having principally four carbon atoms per molecule is introduced through feed conduit 1 into solvent extraction or absorption apparatus 3, into which is simultaneously introduced through conduit 2 an aqueous solution of sulphuric acid of medium concentration of about 50% by weight. The proportion of acid to hydrocarbon being treated and the proper control of operating conditions in extractor 3 are determined generally as indicated in the above noted patents, and with due regard to whether the original charge contains a substantial proportion of diolefines from which extraction of monomeric materials may be more difficult. From extractor 3 is removed a gaseous hydrocarbon raffinate phase through conduit 4, substantially free of isobutylene; and there is withdrawn from extractor 3 through conduit 5 a liquid extract phase of sulphuric acid containing the extracted isobutylene. This liquid acid extract phase is conveyed directly to a polymerizing apparatus 6 for treatment therein and without being submitted to an intermediate regeneration or isolation or separation of isobutylene from sulphuric acid.

In one alternative mode of operation in accordance herewith, the operating conditions in polymerizer 6 are selected so that all the isobutylene will be polymerized, with the exception of a small quantity monomer which may be evolved or liberated and so that the aqueous sulphuric acid solution is substantially totally freed from the isobutylene it contained. Thus, the polymerized product is withdrawn from polymerizer 6 through conduit 7 (as by decantation) and along with the small quantity of gaseous isobutylene. The aqueous solution of sulphuric acid at substantially the same concentration at which it was originally introduced is withdrawn from polymerizer 6 through conduit 8 and is in condition for direct recirculation back to a subsequent extraction step through conduit 2 without dilution or purification or other recovery or regeneration steps.

In an alternative mode of operation, as may be desired in accordance with the proportion of monomer and polymers in the final product, only a portion of the isobutylene in the liquid acid extract is polymerized. In this case, the polymerization conditions of reactor 6 are selected (e.g., time and temperature as noted above) to withdraw from the reactor 6 through conduit 7 isobutylene polymers and a minor portion of the gaseous monomer, while a solution of sulphuric acid still containing the desired amount of unpolymerized monomer is withdrawn through conduit 9 to a stripping or separating apparatus 10 from which gaseous monomeric isobutylene is liberated from the acid solution in known manner and withdrawn through conduit 11, while the acid solution substantially freed of all isobutylene and other hydrocarbons is withdrawn through conduit 12 for recycling back to the extraction step and at essentially the original concentration and composition without further purification or treatment.

Appropriate apparatus for carrying out the foregoing steps and for implementing the extraction and polymerization and separation of units 3, 6, and 10 is well known and understood by men skilled in this art. Particularly for the extraction of isobutylene, as well as for the separation of monomer if desired, the disclosures of the above noted patents are appropriately applicable. The polymerization step is satisfactorily accomplished in virtually any conventional apparatus appropriate for accomplishing the desired separating conditions as to rapid heating to temperature, holding for the desired reaction time, and separation of the hydrocarbon and aqueous phases. For example, satisfactory results have been achieved in accordance herewith utilizing a heated tank or similar vessel fed at the desired speed for the desired reaction time or a heated coil of appropriate dimensions to achieve the desired reaction time. At the take-offs of the polymerization apparatus 6, any gaseous monomer produced by heating up the temperature is separated, then the liquid may be cooled and the polymers recovered by simple decantation, while the sulphuric acid solution is directly returned to extractor 3.

As will be apparent from the foregoing, systems and techniques in accordance herewith are advantageously applicable to a number of situations which may become significant in large scale commercial operation. For example, in the production of isooctene, particularly, if it is desired to obtain a dimer of isobutene substantially free of dimers of n-butylene or co-dimers of isobutylene and n-butylene, such selectivity is readily achieved in accordance herewith. Similarly, this invention permits the simultaneous production of pure isobutylene and isooctene with the same apparatus and the same sulphuric acid solution. Indeed, such techniques are particularly important commercially and readily versatile when it is desired to vary the ratio of tonnages of the several products to follow the immediate demands of the market.

Also this invention is readily applicable to the situation where the principal product desired may be a hydrocarbon raffinate substantially free of isobutylene and particularly when operated primarily to remove isobutylene from the original mixture rather than concentrating completely or partially on production of pure monomer. Indeed, satisfactory results are achieved in the purification of a fraction of olefinic hydrocarbons to obtain a mixture freed of isobutylene even in situations where the concentration of isobutylene in the original mixture is so low that economic operation as a process for separating isobutylene as a principal product would normally not be considered. For example, satisfactory results have been achieved in accordance herewith in purifying a cut of butene-1 crude containing only 5% to 7% isobutylene and 0.5 to 1% butene-2 and butadiene to obtain substantially pure butene-1 containing less than 0.5% isobutylene.

As further illustrative of this invention, one may note a particular example directed to the simultaneous production of monomeric isobutylene and dimers thereof in relative proportions selected as desired. Thus, into extraction apparatus, comprising two conventional extractors in series and a final washing column, there was fed continuously into the first extractor 10 kg./hr. of a mixture containing, in mole percent, 41.3 isobutylene, 22.3 n-butenes, 1.4 butadiene, 35.01 butanes plus five carbon hydrocarbons and traces of three carbon materials. Into the washing column for counter-current circulation through the extraction steps there was fed 19.7 kg./hr. of aqueous sulphuric acid solution of a concentration of 50.9% by weight acid. The temperature of the first extractor was maintained at about 37° C., while the second extractor and the washing column were maintained at temperatures of about 22° C.

There was withdrawn from the final column a raffinate comprising a mixture of hydrocarbons which contained no more than about 0.4 mole percent isobutylene, while the extract withdrawn from the first extractor was an aqueous solution of sulphuric acid in which had been absorbed isobutylene of the order of 0.7 mole of isobutylene per mole of sulphuric acid.

In this particular example it was desired to polymerize about 55% of the isobutylene and to recover the rest as a monomeric product. To this end the aqueous extract was immediately introduced into polymerization apparatus at a temperature of about 100° C., and was maintained at that temperature during about 15 minutes at approximately atmospheric pressure. In the course of this treatment, 54.4% by weight of the isobutylene was polymerized (48.7% dimers and 5.7% trimers and heavier polymers) which was decanted to separate 6.2% of gaseous monomer. The acid solution, still containing 39.4% of the original isobutylene, was introduced into separating or regeneration apparatus from which was quantitatively recovered all the isobutylene as monomer and the sulphuric acid solution with 50.9% of acid and substantially free of hydrocarbons and/or other reaction products (as indicated by the complete clarity of the recovered solution) which was directly continuously recycled into the extraction step.

When, on the other hand, it was desired to polymerize only about 20% of the isobutylene absorbed in the acid extract (instead of 55% as above), the temperature of the polymerization step was merely lowered to about 80° C. and the duration of reaction at that temperature maintained at about the same 15 minutes. In such case there was obtained 20.8% of polymers (18.6% dimers and 2.2% trimers and heavier polymers). The rest of the isobutylene was recovered as gaseous monomer— 1.5% in the course of the polymerization and 77.7% by separation from the aqueous acid phase withdrawn from the polymerization step in separator 10. As will be apparent from both the foregoing situations, the final purity of the monomer depends to a certain extent upon the degree of polymerization desired, but routinely achieves and often surpasses a purity of 99% in operations in accordance herewith.

As will be apparent from the foregoing, there are thus provided in accordance herewith combinations of method steps and apparatus for accomplishing the selective or simultaneous separation or polymerization of olefinic hydrocarbons in mixtures including closely related hydrocarbons, and in a manner by which a single multipurpose installation may be used for accomplishing either or both separation of the monomer and/or polymerization thereof in a single reuseable aqueous sulphuric acid solution in accordance with virtually any relative proportioning of monomeric and polymeric products as may be desired or indicated by a particular market situation or otherwise. Similarly, following the teachings hereof, and despite the contrary conclusions of the art heretofore believed controlling, satisfactory results are achieved either in complete separation of relatively pure monomer in a sulphuric acid of less than 55% acid concentration without undesired polymerization (or condensation or dilution thereof) or in polymerization of the monomer to virtually any extent desired notwithstanding that the sulphuric acid solution has no more than 55% concentration, and any of such selective or simultaneous advantages are achieved merely by controlling the operating factors such as time, temperature, etc. in accordance herewith.

While the methods and forms of apparatus described herein form preferred embodiments of this invention, this invention is not limited to these precise methods and forms of apparatus, and modifications can be made therein without departing from the scope of this invention which is defined in the appended claims.

What is claimed is:
1. In a process for selectively separating isobutylene from mixtures thereof with other saturated and unsaturated hydrocarbons having closely related boiling points and for selectively homopolymerizing at least a substantial proportion of said iso-butylene, the steps consisting essentially of:
 (a) selectively absorbing said isobutylene from said mixture into an aqueous solution of sulfuric acid having an acid concentration from 50% to 55% by weight to form an aqueous extract phase rich in isobutylene;
 (b) separating the remainder of said hydrocarbon mixture from said aqueous extract phase substantially free of said isobutylene;
 (c) heating said aqueous extract phase with said isobutylene absorbed therein by homopolymerizing a first portion of isobutylene, said heating being carried out a temperature between 70° C. to 140° C. for a time period between 2 min. and 60 min., to obtain a degree of polymerization of iso-butylene in said aqueous extract between 25% and 75% by weight of said isobutylene;
 (d) separating said homopolymerized isobutylene from said aqueous extract by decantation;
 (e) separating unpolymerized isobutylene from the aqueous extract, from which the homopolymerized isobutylene was separated, by stripping substantially only said aqueous extract to obtain a stripped aqueous acid solution;
 (f) recycling said stripped aqueous acid solution to said absorbing step substantially in the absence of further treatment of said solution.

2. A process as recited in claim 5 in which the temperature of said heating step is maintained within the range of about 80° to 110° C.

References Cited
UNITED STATES PATENTS

| | | | |
|---|---|---|---|
| 1,889,952 | 12/1932 | Mueller-Cunradi et al. | 260—683.15(A) |
| 2,171,928 | 9/1939 | Gage | 260—683.15(A) |
| 2,408,725 | 10/1946 | Belchetz | 260—683.15(A) |
| 2,424,143 | 7/1947 | Brown | 260—683.15(A) |
| 2,968,682 | 1/1961 | Crouse et al. | 260—677(S) |
| 3,005,856 | 10/1961 | Gislon et al. | 260—677(S) |

PAUL M. COUGHLAN, Jr., Primary Examiner

U.S. Cl. X.R.

260—677